United States Patent [19]

Le Devehat

[11] 4,190,080
[45] Feb. 26, 1980

[54] ARTICULATED LOADING ARM CONTROL SYSTEM

[75] Inventor: Eugene R. Le Devehat, Saligny, France

[73] Assignee: FMC Corporation, San Jose, Calif.

[21] Appl. No.: 888,608

[22] Filed: Mar. 17, 1978

[30] Foreign Application Priority Data

Mar. 17, 1977 [FR] France .................................. 77 08070

[51] Int. Cl.² .......................... B65B 3/04; F15B 9/00
[52] U.S. Cl. ..................................... 137/615; 141/387; 91/216 A
[58] Field of Search ...................... 137/615, 616, 616.3, 137/616.5, 616.7; 141/279, 284, 387, 388; 91/216 A, 382, 383, 374

[56] References Cited

U.S. PATENT DOCUMENTS

| | | | |
|---|---|---|---|
| 2,761,285 | 9/1956 | Beecroft | 91/383 |
| 2,854,187 | 9/1958 | Crooks | 91/374 |
| 3,705,610 | 12/1972 | Baudras | 137/615 |
| 3,889,728 | 6/1975 | Ritche | 137/615 |
| 4,029,126 | 6/1977 | Miyazaki et al. | 137/615 |
| 4,050,585 | 9/1977 | Wilms | 137/615 |
| 4,109,688 | 8/1978 | Jameson | 137/615 |

*Primary Examiner*—Martin P. Schwadron
*Assistant Examiner*—A. Michael Chambers
*Attorney, Agent, or Firm*—W. W. Ritt, Jr.; John F. Verhoeven

[57] ABSTRACT

An articulated fluid loading arm for delivery of gasoline or other liquids through a drop pipe into a tank truck or railway tank car. The arm is equipped with a control system comprising a hydraulic jack for regulating the angle defined by the inboard and outboard arm sections, a sensor system that senses a change in the attitude of these two arm sections and actuates the hydraulic jack to maintain the drop pipe in an established azimuthal position as it is lowered into and raised out of the tank truck or tank car hatch, and means for adjusting the sensor system to make it functional for various locations of the drop pipe.

14 Claims, 7 Drawing Figures

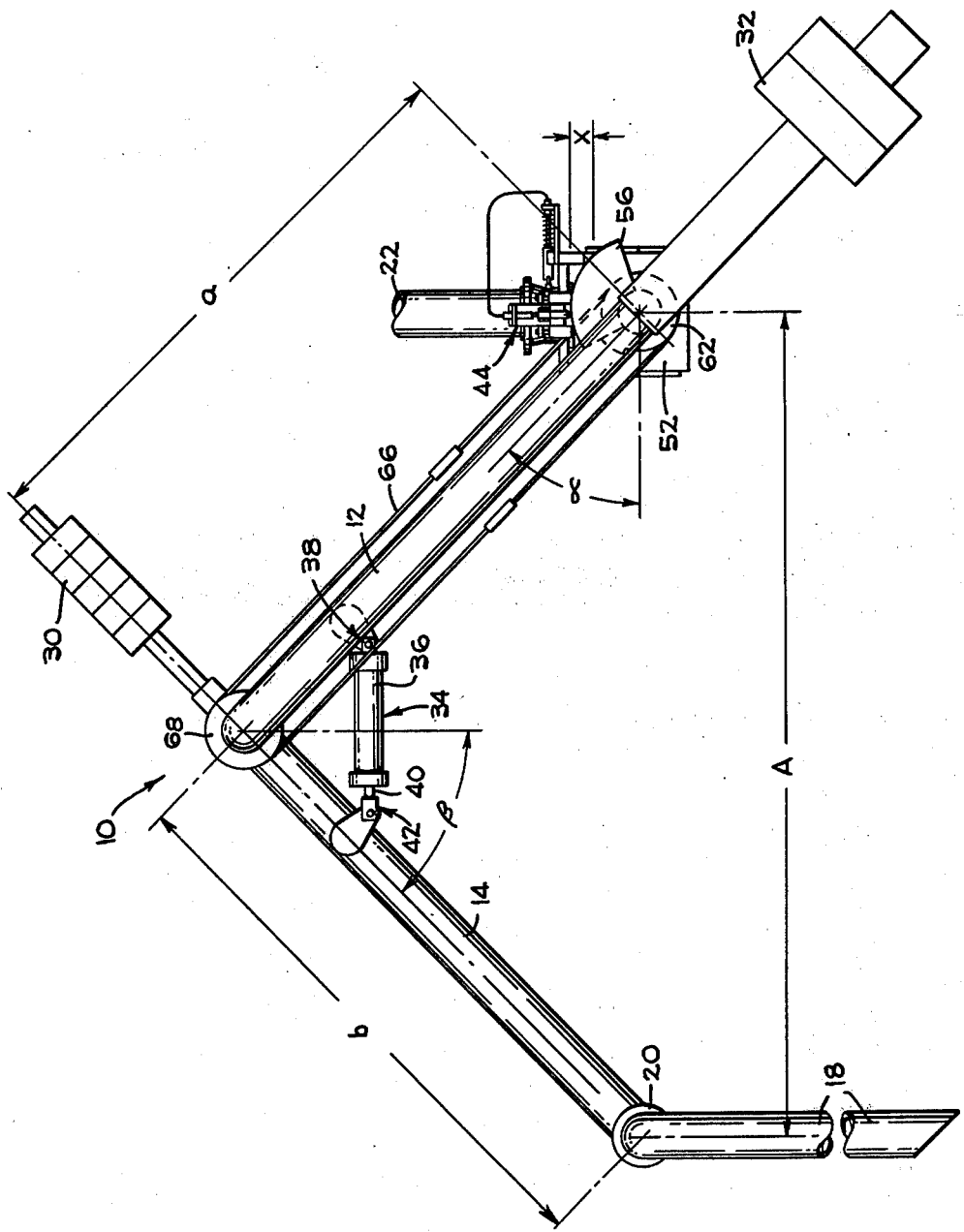
FIG_1

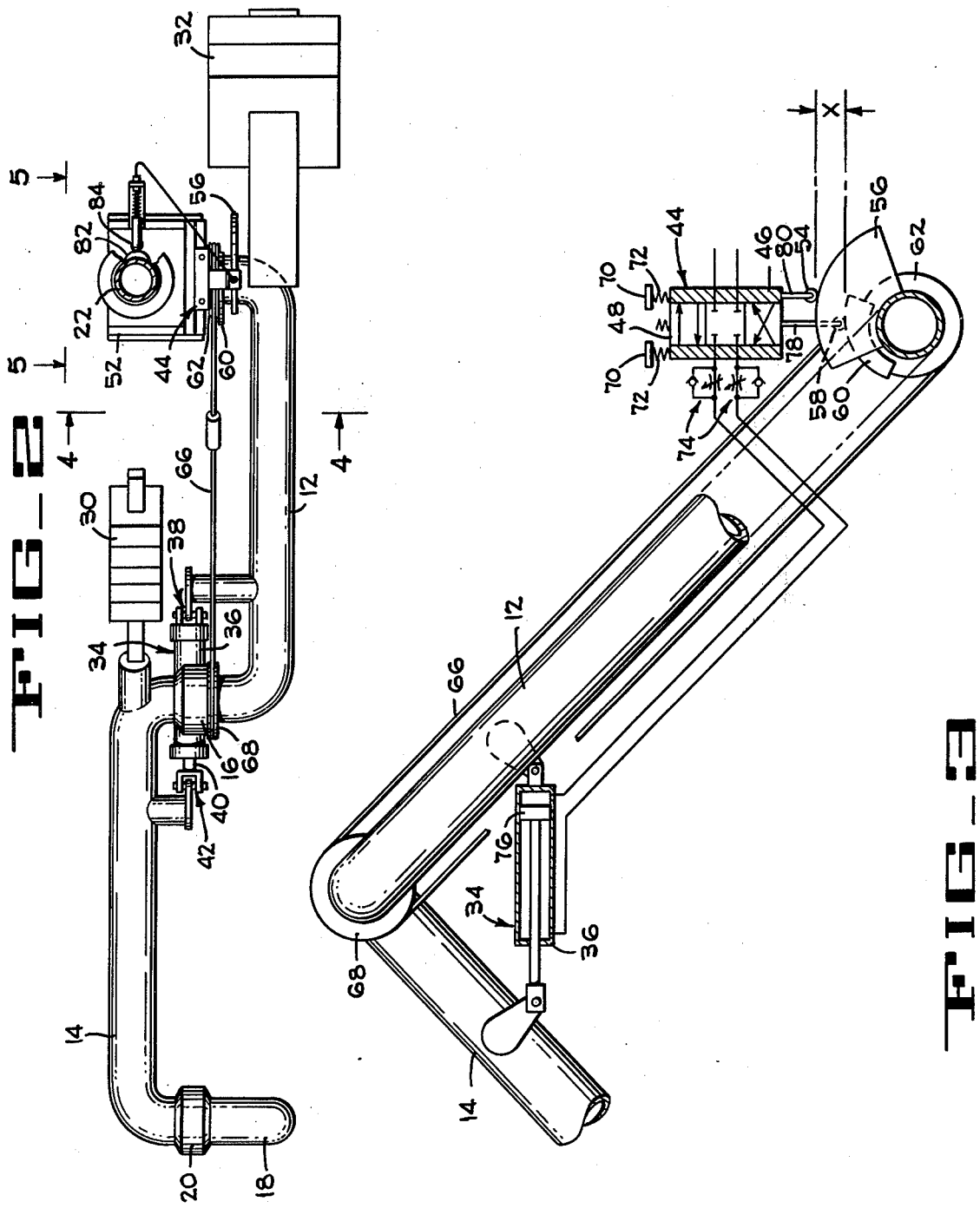

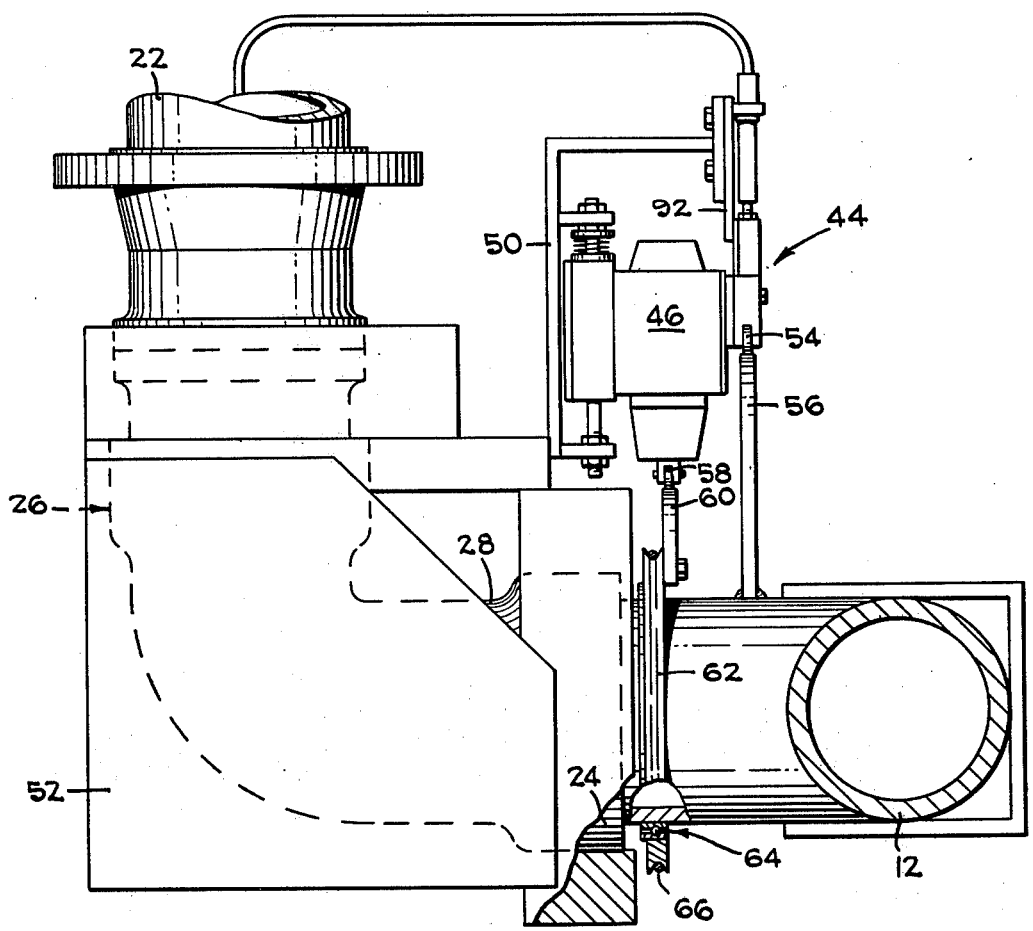
FIG_4
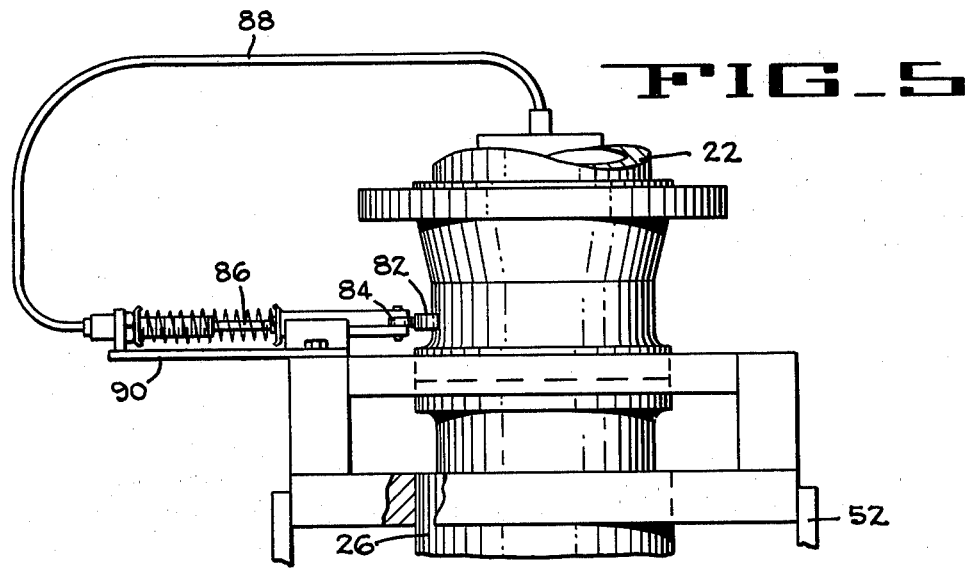
FIG_5

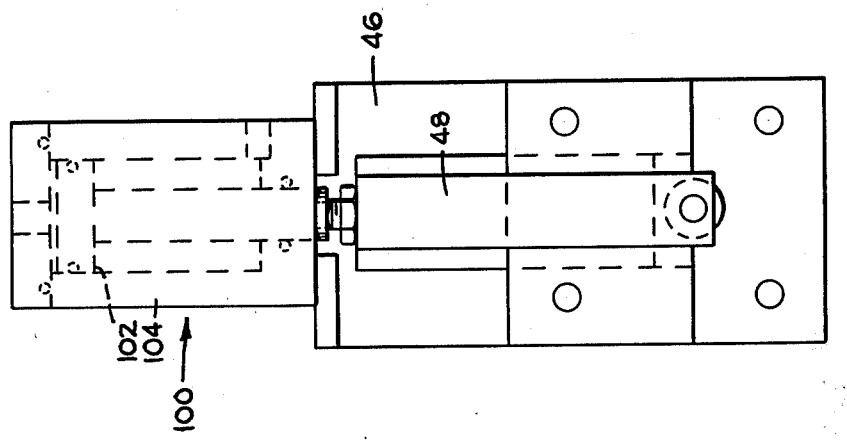
FIG_7
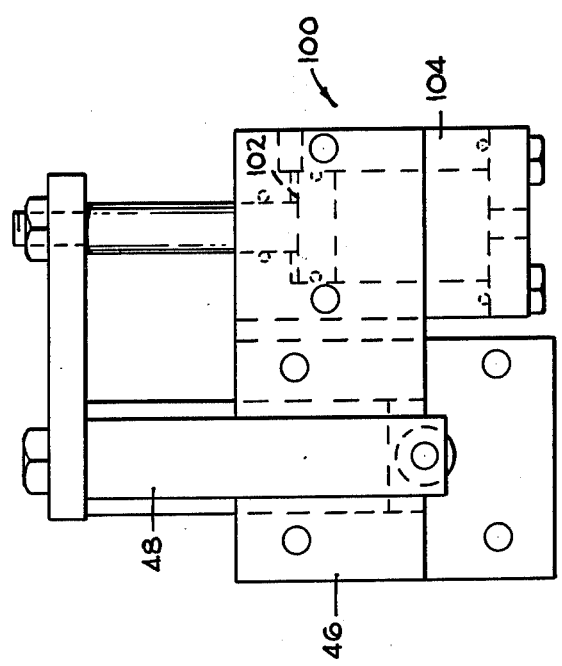
FIG_6

ARTICULATED LOADING ARM CONTROL SYSTEM

BACKGROUND OF THE INVENTION

Field of the Invention

The present invention relates to articulated loading arms for transferring fluid such as gasoline or other petroleum products into a transport vessel, such as a tank truck or railway tank car. More particularly, the present invention relates to systems for controlling the movement of fluid loading arms as they are maneuvered into and out of their functional positions.

Articulated loading arms for delivery of gasoline and other fluids into truck and railway tankers usually include a drop pipe at the outer end for insertion into a filler hatch in the top of the tank, the drop pipe then being lowered to a position close to the bottom of the tank. The maneuverability of these arms must be adequate to enable the drop pipe to be positioned precisely over the tank hatch even though the hatch is not in its designated loading location, and also to facilitate lowering the drop pipe into the tank, and lifting it out of tank, along an absolutely vertical path so that no change occurs in the pipe's azimuthal position.

For this purpose, known articulated fluid loading arms comprise an inboard arm section pivotally mounted on a suitable support for movement about horizontal and vertical axes, an outboard arm section pivotally connected to the inboard arm section for movement about another horizontal axis, and a drop pipe pivotally connected to the outer end of the outboard arm section and depending vertically therefrom, the inboard and outboard arm sections and the drop pipe together comprising a fluid-tight conduit. Suitable linkages are employed to facilitate vertical movement of the drop pipe, and counterweights usually are included to balance the entire assembly, which assembly is sometimes mounted on a movable carriage. Due to the importance of raising and lowering the drop pipe in a strictly vertical path regardless of where the tank filler hatch is situated, the assembly generally is complicated and often relatively heavy and cumbersome, and consequently manufacturing costs are unusually high.

There also is known, notably in the field of public works, articulated loading arm equipment wherein the various sections of the arm are pivotable relative to one another by actuating devices, such as hydraulic or pneumatic jacks. However, in these arm assemblies, each actuating device has to be operated separately, so that moving the drop pipe in an absolutely vertical path requires the equipment operator to have perfect coordination and unusually great dexterity.

SUMMARY OF THE INVENTION

The present invention comprises an articulated fluid loading arm control system for maintaining the drop pipe connected to the outer end of the arm in a given azimuthal position as this drop pipe is lowered into or raised out of the hatch of a tank truck or railway tank car. The control system comprises a hydraulic jack interconnected between the inboard and outboard arm sections near their pivotal junction to increase or decrease the angle defined by these sections, and a sensor system that directs hydraulic pressure to the jack in response to movement of either the inboard or outboard sections. The sensor system includes a hydraulic fluid control valve actuated by a pair of cams that rotate about the horizontal axis through the pivotal mounting of the arm on its support, this rotation occurring in response to movement of the inboard and outboard arm sections about their horizontal pivot axes, one cam responding to inboard arm section movement and the other cam to movement of the outboard arm section. The control system also includes means for adjusting the position relationship between the sensor system hydraulic control valve and the cams by which it is actuated, thereby facilitating proper functioning of the control system when the drop pipe is in any of a plurality of azimuthal positions.

More specifically, the position control system for the inboard arm section comprises a first cam rigidly mounted on the inner elbow of the inboard arm section for pivotal movement with this arm section about the horizontal axis through the pipe swivel joint interconnecting the arm to its support structure. A roller or other suitable cam follower transmits movement of this first cam to the body of the hydraulic control valve, causing the valve body to move in relation to its flow control element and admit hydraulic pressure to the jack, thereby changing the angle between the inboard and outboard arm sections.

In a similar specific sense, the system for the outboard arm section includes a second cam fixed to a first sheave that is rotatably mounted on the same inner elbow of the inboard arm section for pivotal movement about the same horizontal axis through the swivel joint interconnecting the arm to its support, and a roller or other suitable cam follower for transferring movement of this second cam to the flow control element of the hydraulic valve. This first sheave is interconnected to the outboard arm section by a pantograph system comprising a second sheave fixed to the outboard arm section and arranged for pivotal movement about the horizontal axis through the pipe swivel joint interconnecting the inboard and outboard sections, and an endless cable extending between and trained around both sheaves to assure their mutual rotation in the same direction. Thus, any movement of the outboard arm section about the axis through the swivel joint connecting it to the inboard arm section causes a corresponding movement of the second cam, resulting in opening the hydraulic control valve, admitting hydraulic fluid pressure to the jack, and adjustment of the angle between the inboard and outboard arm sections to maintain the drop pipe in its given azimuthal position.

The preferred means for adjusting the positional relationship between the control valve and the cams, thereby to compensate for slewing movement of the arm about its vertical mounting axis, comprises a cam mounted for movement with the arm about that axis, and a cam follower that is mechanically linked to the control valve body for moving the valve body in relation to the valve's flow control element in response to such slewing arm movement. The mechanical linkage between the cam follower and the valve body can comprise a cable having a core fixed to the cam follower and the valve body, and a supporting sheath fixed to the arm and in which the core can move longitudinally. Another means for this purpose comprises a small hydraulic jack mounted on the control valve support structure and whose piston is connected to the control valve body, thereby facilitating change in the position of the valve with respect to the cams and varying the resulting response of the valve to the cams.

Accordingly, one object of the present invention is to provide a system for controlling the movement of a vertical drop pipe on a fluid loading arm.

Another object of the present invention is to provide a system for automatically adjusting the angular relationship of two arm sections of an articulated fluid loading arm, to maintain the outer end of the arm in a predetermined azimuthal position.

Still another object of the present invention is to provide means for adjusting the position of the inboard and outboard sections of a fluid loading arm in compensation for slewing movement of the arm, thereby to facilitate maintenance of the outer end of the arm in a given azimuthal position as the outer end is lowered and raised with respect to a preestablished location.

Other objects and advantages of the present invention will become readily apparent from the following description thereof, including the accompanying drawings.

BRIEF DESCRIPTION OF THE DRAWINGS

FIG. 1 is a fragmentary side elevation of a tank truck loading arm embodying the principles of the present invention, showing the arm extended towards a loading position.

FIG. 2 is a plan view of the apparatus illustrated in FIG. 1, with a portion broken away.

FIG. 3 is a diagrammatic illustration of the arm control system shown in FIGS. 1 and 2.

FIG. 4 is an enlarged fragmentary view taken along the line 4—4 of FIG. 2.

FIG. 5 is an enlarged fragmentary view taken along the line 5—5 of FIG. 2.

FIG. 6 is a side elevation on an enlarged scale, of another means for adjusting the positional relationship between the hydraulic control valve and the cams.

FIG. 7 is a view in side elevation of a modified form of the apparatus illustrated in FIG. 6.

DESCRIPTION OF THE PREFERRED EMBODIMENT

As illustrated in FIGS. 1 and 2, a fluid loading arm 10 embodying the principles of the present invention comprises an inboard arm section 12, an outboard arm section 14 pivotally interconnected to the inboard arm section by a pipe swivel joint 16, and a drop pipe 18 pivotally connected to the outer end of the outboard arm section 14 by another pipe swivel joint 20. The arm 10 is pivotally connected to a vertical fluid supply conduit 22, said conduit mounted on a suitable support structure (not shown), by a trunnion pipe swivel joint 24 (FIG. 4) oriented on a horizontal axis, a vertical axis pipe swivel joint 26, and a pipe elbow 28 interconnecting the joints 24,26. Accordingly, a fluid-tight articulated conduit is provided for transferring gasoline, other petroleum products, or other suitable fluids, from a supply reservoir (not shown) into a transport tank of a truck or railway car (not shown) when the drop pipe 18 has been properly introduced into the hatch or other inlet opening of the transport tank.

In order to facilitate manual movement of the arm 10, a suitable counterbalancing system, such as a counterweight assembly 30 for counterbalancing the outboard arm section 14 and drop pipe 18 about the axis through the swivel joint 16, and another counterweight assembly 32 for counterbalancing the entire arm about the axis through the trunnion swivel joint 24, is appropriately mounted on the outboard and inboard arm sections, respectively, in a conventional manner.

A jack 34, operated by hydraulic pressure supplied from a suitable source (not shown), interconnects the inboard and outboard arm sections 12,14 near their pivotal junction at the swivel joint 16. The cylinder 36 of the jack 34 is connected by a clevis assembly 38 to the inboard arm section 12, and the piston rod 40 of the jack is likewise connected to the outboard arm section 14 by a similar clevis assembly 42.

The fluid pressure to operate the jack is controlled by a three position, two way hydraulic valve 44, having a valve body 46 and a flow control element 48 (FIG. 3). As seen best in FIG. 4, the valve body 46 is mounted for vertical longitudinal movement on a support bracket 50 that is fixed to a structural support 52 interconnecting the swivel joints 24,26, and thus pivots with the arm 10 and the support 52 about the vertical axis through the joint 26. A roller-type cam follower 54 is mounted on the valve body 46, and cooperates with a cam 56 fixed to the inboard arm section 12 to vary the position of the valve body in a longitudinal direction in response to pivotal movement of the inboard arm section about the horizontal axis of the trunnion swivel 24.

The valve flow control element 48 is moved longitudinally with respect to the valve body 46 by another roller-type cam follower 58 that rides on a cam 60. As shown in FIG. 4, the cam 60 is fixed to a first or inner sheave 62 that is rotatably mounted, as by an annular bearing assembly 64, on the inboard arm section 12, and an endless cable 66 interconnects the sheave 62 with a second or outer sheave 68 that is secured to the female portion of the swivel joint 16. As the female portion of the swivel joint 16 is fixed to the outboard arm section 14, pivotal movement of the outboard arm section causes corresponding movement of the sheave 68, and this movement is transmitted by the endless cable 66 to the first sheave 62. Accordingly, pivotal movement of the outboard arm section 14 with respect to the inboard arm section 12 causes corresponding movement of the cam 60, and thus a relative change in position between the valve control element 48 and the valve housing 46.

In order that the jack 34 may be supplied with fluid, and consequently so that the outboard arm section 14 is actuated, it is necessary for the fluid passages of the valve control element 48 to be more or less in registration with the inlet and outlet passages of the valve body 46. When no portions of these passages are in registration, the inboard and outboard arm sections 12,14 are immobile relative to one another; this situation corresponds to a predetermined relative position of the valve control element 48 and of the valve body 46, and to a given distance X between the point of the cam 56 in contact with the roller 54, and the point of the cam 60 in contact with the roller 53. Therefore, variation of the distance X due to rotation of the cam 56 produces an at least partial registration of the passages of the valve body 46 and the valve control element 48, producing a relative movement in one direction or the other between the cylinder 36 and the piston rod 40 of the jack 34, depending upon how the fluid supply to the valve and the jack is connected. Since the operation of the jack 34 results in an increase or decrease of the angle between the inboard and outboard arm sections 12,14, sufficient pivotal movement of the sheave 68 and the sheave 62, and consequently corresponding movement of the cam 60, in the proper direction will restore the initial value to the distance X, and when this value is reached the valve 44 is closed (FIG. 3), and the outboard arm section 14 is immobilized.

The cams 56,60 are shaped so that for each increment of rotation of the cam 56 there is a corresponding increment of rotation of the cam 60 (with a very slight delay). Thus, for a small variation in inclination of the inboard arm section 12 there is a correspondingly small variation in position of the outboard arm section 14, causing a purely axial movement of the drop pipe 18 until the immobilization of the inboard arm section 12. In the case of FIG. 1 where the inboard arm section 12 and the outboard arm section 14 form a right-angle, and where the horizontal pivot axis of the inboard arm section is at the same level as the axis of articulation of the outboard arm section and of the drop pipe 18, raising the inboard arm section produces a corresponding increase in the angle between the arm sections 12,14, so that the drop pipe 18 moves upwardly in a purely axial direction. Furthermore, lowering the inboard arm section 12 produces a corresponding increase in the angle between the arm sections 12,14 so that the drop pipe 18 moves downwardly in a purely axial direction.

The foregoing result is obtained precisely by means of the forming of a suitable profile for the cams 56,60, so that on any given rotation of the cam 56 there will be a corresponding rotation of the cam 60 enabling, with a purely axial movement of the drop pipe 18, the restoration of the distance X to its initial value.

The apparatus of the present invention can be considered to be a slaved system (and here even regulated) for assuring that the distance A from the axis of the drop pipe 18 to the pivot axis of the trunnion swivel 24 is kept constant. This distance A can be expressed in various ways, notably as a function of the length a of the inboard arm section 12 from the trunnion swivel axis to the axis of the swivel 16, of the length b of the outboard arm section 14 from the axis of the swivel 16 to the axis of the swivel 20, these two lengths being constant by construction, of the angle $\alpha$ between the inboard arm section 12 and the horizontal, and of the angle $\beta$ between the outboard arm section 14 and the vertical, to produce the relationship $A = a \cos\alpha + b \sin\beta$. Thus, it is easily seen that, in the arm of the invention, the distance A is kept constant due to the fact that any variation of the angle $\beta$ is compensated by a variation of the angle $\alpha$ due to the action of the jack 34. The angular variations in position of the arm sections 12,14 are translated by the changes of the position of the cams 56,60, and the distances between the common pivot axis of the two cams 56,60, and the portion of each cam which cooperates with the corresponding contact rollers 54,58 constitute, respectively, two variables having a constant difference when the movement of the drop pipe 18 is purely axial, this difference X being associated with the desired distance A which constitutes the input or reference magnitude of the slaved system. Any variation between the "input" distance A and a measured distance A' (output magnitude), implying that $\alpha$ or/and $\beta$ do not have the appropriate values, is reflected by a difference between the actual value of X and the theoretical value of X (initial inactive value), and this latter difference when transmitted to the valve 44, which plays the part of a comparator, serves to actuate the jack 34 until said difference has been eliminated.

As illustrated diagrammatically in FIG. 3, the body 46 of the valve 44 is held against fixed stops 70 by return springs 72, and variable throttle members 74 are included in the fluid passages connecting the valve to the jack 34 in order to regulate the speed at which the jack piston 76 moves.

The loading arm of the invention may also be equipped with a system to adjust the distance A. In fact, when the vehicle bearing the tank is movable over a railway or roadway, it does not always stop at the same exact spot, and it is therefore desirable that the loading arm be rotatable around a vertical axis such as that of the supply conduit 22, in order that it can be repositioned, and extended to reach the improperly spotted tank hatch. One method for modifying the span of the arm, and consequently the distance A, comprises varying, for a given pair of cams 56,60, the value of the distance X, and then slaving the control system to the new value for A. For example, to make this distance X adjustable, the length of one of the elements 78,80 (FIG. 3) that connects the rollers 54,58 to their corresponding valve members can be changed.

Another system for adjusting the distance X is shown in FIGS. 1, 2, 4 and 5. This system facilitates automatically obtaining a correct positioning of the drop pipe 18, whatever the azimuthal position of the drop pipe happens to be (within the operational limits of the arm). This system comprises a suitably shaped cam 82 (FIGS. 2 and 5) that is fixed to the supply conduit 22, a roller-type cam follower 84 secured by suitable means to one end of a cable core 86, and a cable sheath 88 that is secured at one end to a support bracket 90 mounted on the structure 52, and at its other end to a support bracket 92 also mounted on the structure 50. The other end of the cable core 86 is secured to the valve body 46 in order to transmit to it any longitudinal movement of the core with respect to the sheath 88. Thus, any rotation of the arm about its vertical axis through the supply conduit 22 produces a longitudinal movement of the cable core 86, and a corresponding movement of the valve body 46, resulting in a change in the distance X and the arm span A, and a new azimuthal position of the drop pipe 18. Accordingly, the shape of the cam 82 enables, for any such rotation of the arm between two particular limits, automatic displacement of the axis of the drop pipe 18 along a rectilinear path, the distance X being automatically modified as a function of the angle of rotation.

Another adjusting device of which two embodiments are shown respectively in FIGS. 6 and 7, enable the distance X to be varied, this time manually, to increase or decrease the span of the arm in a given azimuthal direction for example, in the case of loading tanks on road vehicles not stopping strictly at the same spot. This change is obtained by means of the action of a small hydraulic jack 100 whose piston 102 is secured to the flow control element 48 of the valve 44, and whose cylinder 104 is secured to the valve body 46. FIG. 6 shows a construction where the jack 100 is placed at the side of the valve 44, and FIG. 7 a construction where the jack 100 is placed above the valve. This gives the person operating the loading arm the ability to adjust the distance X so that the drop pipe 18 will be in proper position for insertion into the tank hatch.

Obviously, various adjusting devices may be employed on the same loading arm, giving the arm a certain degree of flexibility as to how it is used. The ability of causing the distance X to vary makes the latter a true parameter modifiable as a function of the particular loading requirements.

Although the foregoing description relates to the axial movement of a vertical drop pipe, it should be understood that the invention is also applicable to the axial movement of a horizontal filler pipe capable of being moved along a horizontal straight line on azimuthal displacement of the inboard arm section, or along a vertical straight line for a given azimuthal position of said inboard arm section, the modifications to be introduced therein being within the ability of the technician skilled in the art. This is true for any other position of the axis of the drop pipe 18.

It is also possible to provide any other path for the possible displacement of the drop pipe, while preserving an axial motion on the introduction and withdrawal of said pipe into the hatch of a tank.

Although the best mode contemplated for carrying out the present invention has been herein shown and described, it will be apparent that modification and variation may be made without departing from what is regarded to be the subject matter of the invention.

What is claimed is:

1. An articulated loading arm for the transfer of fluid from a first site to a second site, comprising:
    an inboard arm section pivotally connected to a supply conduit for receiving the fluid to be transferred from the first site;
    an outboard arm section pivotally connected to said inboard arm section to receive fluid therefrom;
    a drop pipe pivotally connected to the outboard arm section to deliver said fluid to the second site;
    a hydraulic jack;
    means for connecting said hydraulic jack between said outboard arm section and said inboard arm section to pivotally move said outboard arm section relative to said inboard arm section;
    means for sensing the attitude of said inboard arm section, including control means and means for coupling said control means to said inboard arm section to facilitate response of said control means to said attitude of said inboard arm section;
    means for sensing the attitude of said outboard arm section, including means for coupling said control means to said outboard arm section to facilitate response of said control means to said attitude of said outward arm section;
    said control means providing hydraulic pressure to said hydraulic jack in response to a change in the attitude of said inboard arm section, said outboard arm section, or both of said arm sections to maintain said drop pipe in a predetermined azimuthal position relative to said supply conduit.

2. An articulated loading arm according to claim 1 wherein said control means includes a hydraulic valve having a valve body and a flow control element slidably mounted in said valve body, and means for coupling said valve body to said inboard arm section to position said valve body in response to said attitude of said inboard arm section.

3. An articulated loading arm according to claim 1 wherein said outboard arm section coupling means includes means for coupling said flow control element to said outboard arm section to position said flow control element in response to said attitude of said outboard arm section.

4. An articulated loading arm according to claims 1 or 3 including means for adjusting the original azimuthal position of said drop pipe.

5. An articulated loading arm according to claim 2 wherein the means for coupling said valve body to said inboard arm section includes a first cam and a first cam follower cooperating with said first cam, one of said first cam and said first cam follower being connected to said inboard arm section and the other being connected to said valve body.

6. An articulated loading arm according to claim 3 wherein the means for coupling said flow control element to said outboard arm section includes a second cam and a second cam follower cooperating with said second cam, one of said second cam and said second cam follower being coupled to said outboard arm section and the other being connected to said flow control element.

7. An articulated loading arm according to claim 6 including means for connecting said hydraulic valve to said hydraulic jack to provide hydraulic pressure to said hydraulic jack when said drop pipe is moved from the original azimuthal position.

8. In an articulated loading arm for the transfer of fluid from a first site to a second site, comprising an inboard arm section pivotally connected to a supply conduit for receiving the fluid to be transferred from the first site, an outboard arm section pivotally connected to said inboard arm section to receive fluid therefrom, and a drop pipe pivotally connected to the outboard arm section to deliver said fluid to the second site, the improvement comprising:
    a hydraulic jack;
    means for connecting said hydraulic jack between said outboard arm section and said inboard arm section to pivotally move said outboard arm section relative to said inboard arm section;
    a hydraulic valve having a valve body and a flow control element slidably mounted in said valve body;
    means for coupling said valve body to said inboard arm section to position said valve body in response to the position of said inboard arm section relative to the horizontal;
    means for coupling said flow control element to said outboard arm to position said flow control element in response to the position of said outboard arm section relative to the vertical; and
    means for connecting said hydraulic valve to said hydraulic jack to provide pressure to said hydraulic jack in response to a change in the position of said inboard arm section, said outboard section, or both of said arm sections to maintain said drop pipe in a predetermined azimuthal position relative to supply conduit.

9. An articulated loading arm according to claim 8 wherein said means for coupling said valve body to said inboard arm section includes a first cam connected to said inboard arm section for pivotal movement with said arm section and a first cam follower connected to said valve body for transmitting movement of said first cam to said valve body causing said valve body to move relative to said flow control element.

10. An articulated loading arm according to claim 9 wherein said means for coupling said flow control element to said outboard arm section includes a second cam, a second cam follower, means for mounting said second cam follower in working engagement with said second cam, and means for coupling said second cam to said outboard arm section for pivotal movement with said outboard arm section.

11. An articulated loading arm according to claim 10 wherein said means for coupling said second cam to said outboard arm section includes a first sheave connected to said second cam for pivotal movement with said second cam, a second sheave connected to said outboard arm section for pivotal movement with said outboard arm section, and a cable connected between said first and said second sheaves to rotate said second sheave and said second cam in response to a pivotal movement of said outboard arm section.

12. An articulated loading arm according to claim 8 including means for adjusting the predetermined azimuthal position of said drop pipe.

13. An articulated loading arm according to claim 12 wherein said means for adjusting the predetermined azimuthal position includes means for adjusting the position of said valve body relative to the azimuthal position of said drop pipe.

14. An articulated loading arm according to claim 12 wherein said predetermined azimuthal adjusting means includes a third cam connected to said supply conduit, a third cam follower mounted in working engagement with said third cam, and means for connecting said third cam follower to said valve body.

* * * * *